UNITED STATES PATENT OFFICE.

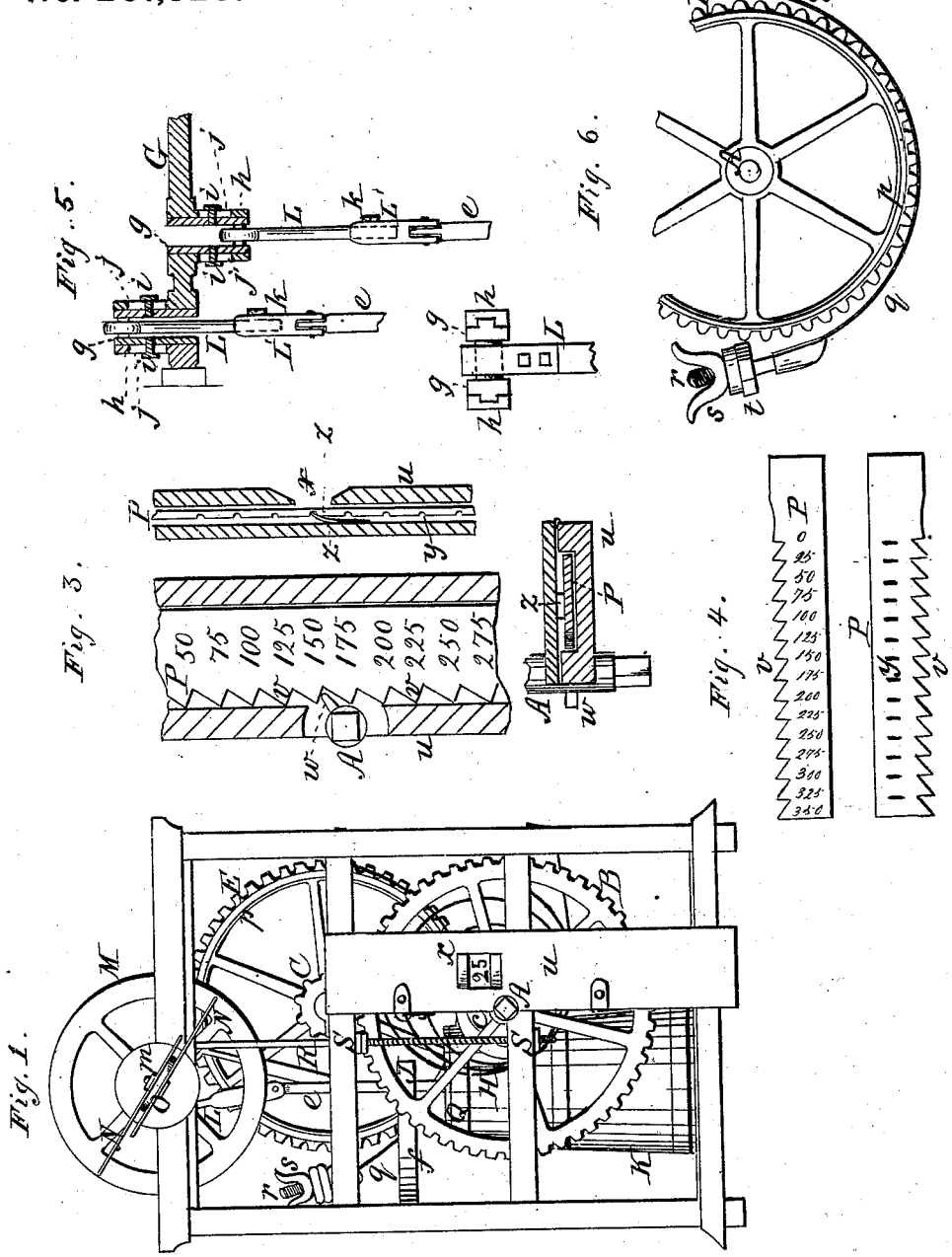

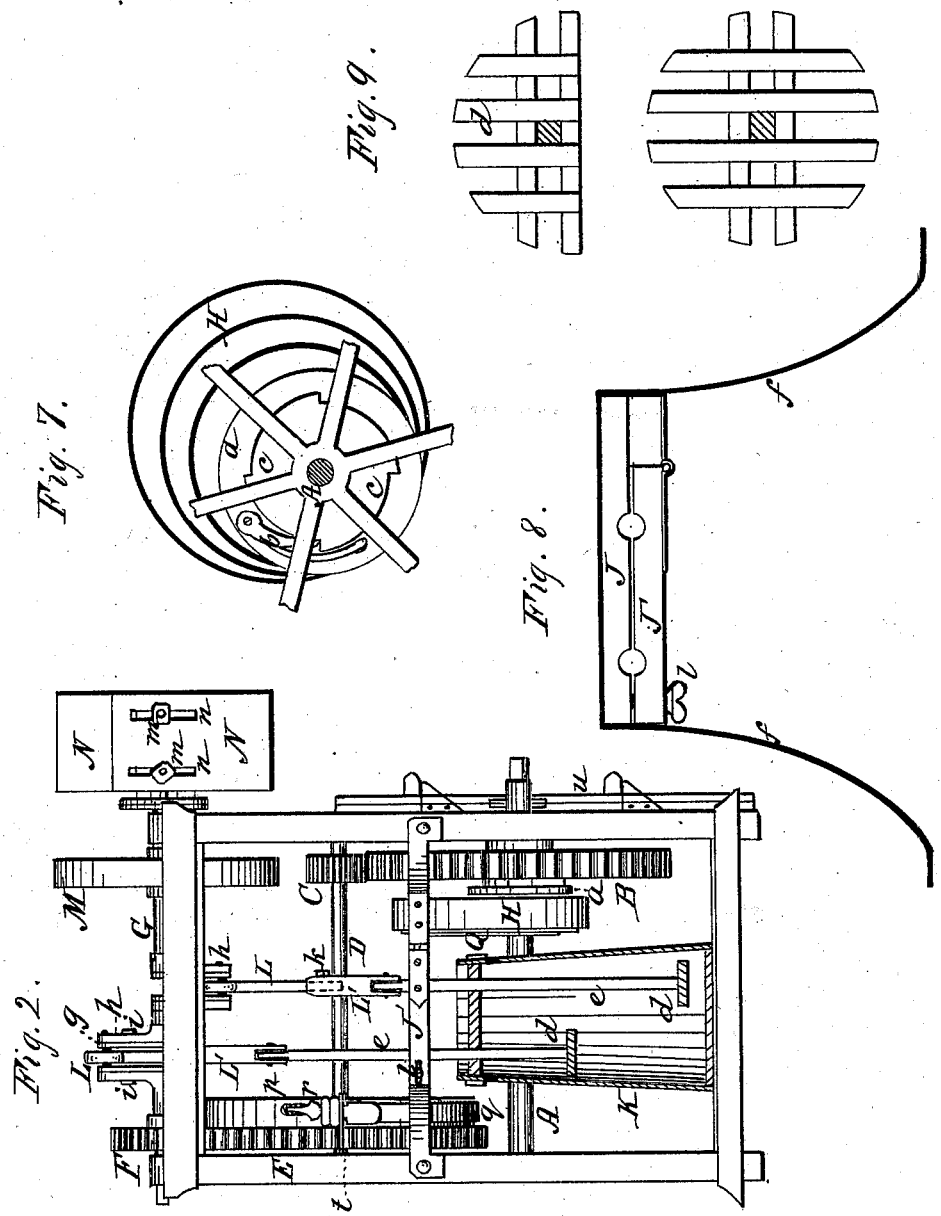

JOHN HUEBETHAL, OF SALINEVILLE, OHIO.

IMPROVEMENT IN CHURNS.

Specification forming part of Letters Patent No. 201,528, dated March 19, 1878; application filed July 2, 1877.

*To all whom it may concern:*

Be it known that I, JOHN HUEBETHAL, of Salineville, in the county of Columbiana and State of Ohio, have invented certain new and useful Improvements in Churns, of which the following is a specification:

I have improved the power-churn in several important particulars and matters of construction, combinations, and devices, embracing, among other things, adjustable crank and dasher-staff connections, for increasing and diminishing the stroke of the dasher to suit the quantity of cream in the churn; an extensible fan device on the crank-shaft, for regulating the speed of the churn by lengthening or shortening the fan-blades; a controllable brake device, by which the churning can be stopped when desired; an indicating device, to show the number of strokes of the dasher in which the churning was completed, so that a single churning will indicate a number by which to determine when the butter is made in subsequent churnings—that is, a gage by which to tell when the butter is made. This is important, especially in a power-churn, and places it within the power of a child to attend the operation of the churn. This indicating device is operated in a manner to show the exact number of strokes of the dasher required to make the butter, so that subsequent churnings may be determined by the same gage.

The frame of the churn is braced by stay-rods in a manner to support the shafts of the operating-gearing with proper relation to each other, to cause said gearing to run as easy as possible.

Referring to the drawings, Figure 1 represents an elevation of my improved power-churn; Fig. 2, an elevation at right angles to Fig. 1; Fig. 3, sectional views of the indicating device; Fig. 4, views of the indicating-slide detached; Fig. 5, sectional views of the adjustable crank and dasher-shaft connections; Fig. 6, detail view of the brake; Fig. 7, detail view of the spring-winding device; Fig. 8, detail view of the dasher-staff guide, and Fig. 9 the dasher.

The churn is of the kind having reciprocating dashers, operated by a crank-shaft, and the several operating devices are suitably arranged and supported in a frame. As shown, the churn is adapted for operation by a spring-motor; but it is obvious that a weight-power may be used instead of the spring.

The main driving-shaft A carries a large cog-wheel, B, which meshes into a pinion, C, on a shaft, D, which carries at its opposite end a large cog-wheel, E, which meshes with a pinion, F, on a crank-shaft, G, at the top of the frame.

The spring-motor H is attached by one end to the main shaft A, and by the other to the frame; and this shaft A carries a disk, $a$, Fig. 7, with a pawl, $b$, in position to take into a ratchet-disk, $c$, fixed to the first mentioned large cog-wheel B, which, being mounted loosely upon said shaft, is turned to operate the churn by means of the pawl $b$ and ratchet-disk $c$, which connects the shaft with said cog-wheel.

The spring H is wound up by turning the shaft.

The crank-shaft G is adapted for double dashers $d$, the staffs $e$ of which work through a guide-piece, J, supported above the churn-barrel K by spring-arms $f\,f$, Fig. 8, curving outward from the ends of the guides and secured to the frame, the object of which is to render the guide J slightly self-adjusting horizontally endwise, to allow the dasher-staffs $e$ to work without binding, and to conform to any slight inequality in the vertical guides which might be caused by the crank-shaft connections.

The pivoted connecting-rods L of the dasher-staffs are joined to adjustable sections $g$ of the cranks $h$, said sections being fitted between the crank-arms with tongue and groove, and secured by screws $i$, which pass through slots $j$ in the crank-arms into the adjustable sections $g$, by which the latter are rendered extensible, to increase or diminish the throw of the dashers. In connection with this adjustment of the cranks, I make the connecting-rods L in sections, the lower section L' being socketed to receive the upper section, and secured by a clamp-screw, $k$, which passes through the socket-section, so that the connecting-rods are adjusted to conform to the adjustment of the cranks. This adjustment is important to give the proper agitation according to the quantity of cream in the barrel, and to give the dasher-staffs a vertical movement.

The guide-piece J for the dasher-staffs has a hinge-section, J', secured by a turn-button, l, or other device, to allow said hinge-section to be opened to remove the barrel when the butter is made, and to be closed to form the guides for the dasher-staffs.

The crank-shaft has a balance-wheel, M, and in addition to this I provide said shaft with an extensible regulating fan device, composed of two slotted plates or wings, N, secured to a flat head, O, on said shaft by screw-bolts m, passing through the slots n of said wings, so that the latter may be extended equally outward, and set in to regulate the speed of the churn.

The second large wheel E on the intermediate shaft has a rim, p, projecting from one side, to which a band, q, is fitted, to partially surround it, being fixed at one end to the frame, and rendered adjustable at the other end by screw r and thumb-nut S connection, with a bracket, t, on the frame, so that by turning the nut S the brake-band q is made to hug the rim p, and thus stop the operation of the churn when desired. That portion of the brake-band which passes through its connecting-bracket t is made angular, to prevent the band from twisting when applying the brake.

I have combined with spring or weight power churn-driving mechanism an indicating device, to indicate when the butter is made. A simple form of such indicator is shown in the drawings, and consists of a case, u, secured vertically to the side of the frame contiguous to the driving-shaft A, within which is fitted an indicating-slide, P, provided with teeth or pins v, arranged in a manner to be struck by a pin, w, from said driving-shaft as it revolves, so as to lift the slide a distance equal to the space between the teeth at each revolution of said shaft.

The outer face of the slide P is graduated by numbers corresponding to the number of teeth or pins thereon, and which indicate the number of strokes of the dashers made in churning.

An opening, x, in the outer side of the slide-case u will show these numbers as the churning progresses.

The inner side of the slide-case is provided with notches y, or projections corresponding with the number of teeth, with which a spring-detent, z, on the back of the case acts to hold said slide as it is intermittingly raised, the spring being adapted for this purpose to bear upon the notched side of the slide.

The outer side of the case is hinged to allow it to be opened to wind the spring, and a stop at the bottom of the case limits the descent of the slide, and holds it in position to commence the churning. The hinged section of the case has suitable catches, to secure it when closed.

At the completion of the first churning the indicator will bring to view the number which tells how many strokes of the dashers were required to complete the operation, and this number will be the gaging-point in the movement of the indicator at which to stop the churn in subsequent churnings.

The indicating-slide is fitted to move easily in guideways in its inclosing-case, and the tension of the spring z is only sufficient to allow it to perform its function as a detent in holding the slide at its interval elevations.

By this device an important advantage is gained in showing when the butter is made without stopping the churn to take off the cover, and the machine can be stopped and attended to in this matter by comparatively young persons, and the operation is not continued after the butter is made.

The dashers are light, and composed of horizontal bars crossed at right angles, forming a web with the ends of the bars open, to give a very thorough and complete agitation to the cream, producing the butter very quickly.

The cover of the churn-barrel has an annular band, Q, which projects on both sides of the head, the lower projecting rim fitting into the top of the barrel, making a close joint, preventing splashing and spilling of the milk.

I may use a single dasher with my improvements.

The pinions may be arranged to work with inside large gear, if desired.

To make the gearing run as easily as possible, I arrange a vertical brace-rod, R, Fig. 1, near the bearings of the shafts on each side of the frame, and screw-thread the rods to receive nuts S in contact with the supporting-timbers, by which to adjust the bearings as may be found necessary, and to serve as braces to said timbers.

As before stated, I may use weight-power with my improvements; and I may also use friction-wheels instead of cog-gearing, these matters being constructed as may be found most advantageous, and to produce the best results.

As stated, the connecting-rods are jointed to adjust them in a manner to obviate any friction in working through the guide and churn-head. When the cranks are shortened the rods L L' must be lengthened, and when the cranks are lengthened the rods must be shortened.

It is not intended that the indicating device will give the precise time the butter is made, but only approximately, by the attendant making due allowance for difference in the temperature and in the milk from time to time, so that a person soon learns by the indicator sufficiently near the time for all practical purposes.

In the operation of the churn I have found that seven hundred and fifty revolutions of the crank-shaft will produce butter in ordinary temperature, and with this gage, by making allowances for variations of heat and cold, weather, and the milk, the indicator will enable almost any person to tell when the butter is made.

It will be noticed that the brake consists of a thin spring-steel band, in order that when relaxed by the adjusting-screw it will automatically be separated from the brake-surface. This is important to relieve the friction of the brake while the machine is working, and especially in a spring-power.

It is also important in such a power that the gear-wheels shall not rest bodily upon each other, because of the great friction which such contact would produce. Hence I use the adjusting-screw rods and nuts to support the gear-shafts near their journal-bearings.

I claim—

1. The crank-arms $h\,h$, having the slots $j\,j$ and the face-grooves, in combination with the tongue-sections $g\,g$, the clamp-screws $i\,i$, the crank-shaft G, and the churn-dashers, as and for the purpose herein set forth.

2. The combination, with churn-power driving mechanism, of an extensible fan device on the crank-shaft, for the purpose stated.

3. The extensible fan-wings N, lapped upon each other, and secured to the crank-shaft by means of slots and clamp-screws, as described.

4. The combination, with the crank-shaft and the balance-wheel of a power-churn, of an extensible fan-regulating device, as described.

5. The guide-piece J for the dasher-staffs, combined with the side springs $f$, for the purpose stated.

6. The combination, with spring or weight churn-driving mechanism, of an indicator operated by the churn-motor, for the purpose set forth.

7. An indicator for churn-driving mechanism, consisting of a toothed and gaged slide, P, fitted in a case, and adapted to be operated by a pin, $w$, on the driving-shaft, the rotation of which lifts said slide intermittingly, as set forth.

8. The combination, with a gaged indicating-slide, P, of an inclosing-case, $u$, therefor, and a show-opening, $x$, to expose the slide-numbers as they are intermittingly brought opposite said opening by the interval elevations of the slide, as set forth.

9. The combination of an intermittingly-rising indicating gage-slide with an inclosing-case and a detent, $z$, whereby said slide is held and supported as it is raised by the revolving shaft-pin.

In testimony whereof I have hereunto set my hand in the presence of two witnesses.

JOHN HUEBETHAL.

Witnesses:
JOHN T. DYSART,
WM. W. ORR.